Inventor
William G. Livezey
By Willits, Helmig & Baillio
Attorneys

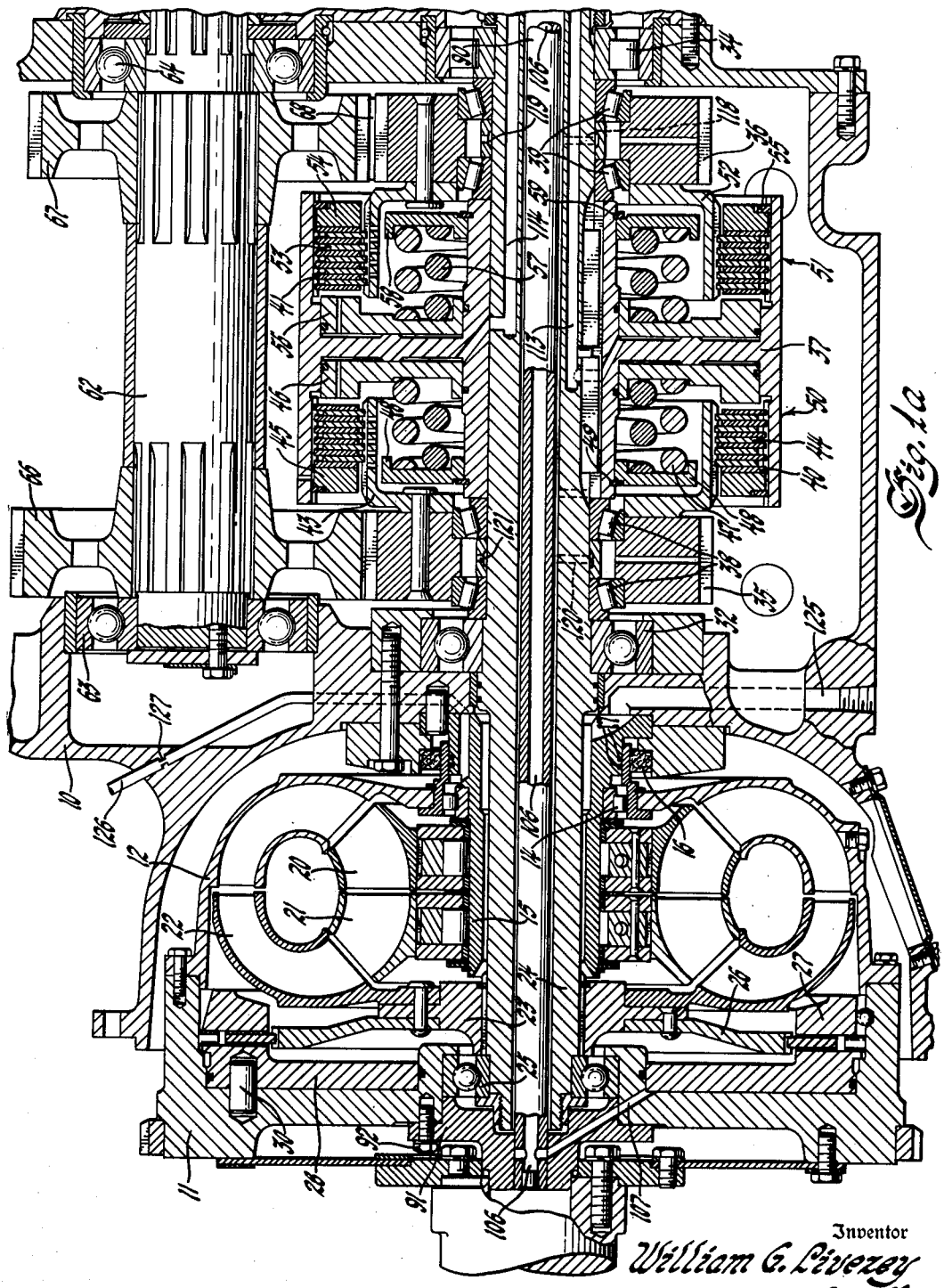

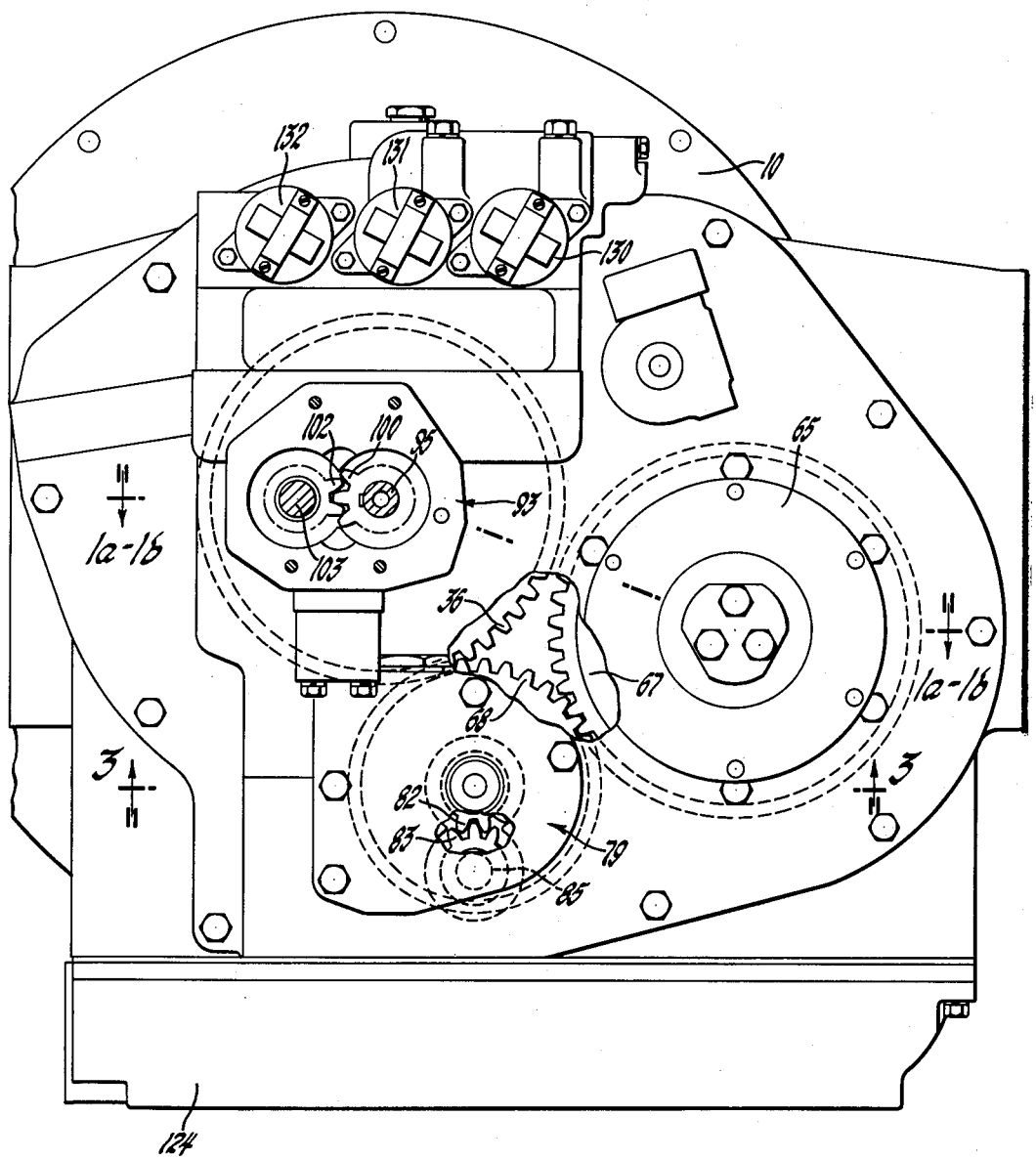

United States Patent Office 2,736,412
Patented Feb. 28, 1956

2,736,412

FLUID CLUTCHES WITH MULTIPLE PUMPS

William G. Livezey, Indianapolis, Ind., assignor to General Motors Corporation, Detroit, Mich., a corporation of Delaware Application June 17, 1950, Serial No. 168,631

9 Claims. (Cl. 192—85)

My invention relates to a transmission for motor vehicles, and particularly to improved transmission hydraulic control means arranged to reduce to a minimum the power consumed by the hydraulic control apparatus.

It has heretofore been proposed to provide a motor vehicle with an engine which is connected to the driving wheels through a transmission governed by hydraulic means, and lubricated by lubricant under pressure. In transmissions of this type a pump operated by the engine is provided to supply lubricant or other liquid under pressure whenever the engine is running, and, when available, the liquid supplied by this pump is adequate to perform all control and lubricating functions. However, there are occasions when the vehicle may be operated with the engine idle, and during these periods it is desired to have lubricant under pressure available to lubricate the transmission, and to also have liquid under pressure available to perform control functions so that the transmission can be made effective to transmit power from the vehicle wheels to the engine to start the engine. Hence, transmissions of this type are provided with another or second pump driven from the transmission output shaft so that this pump is available to supply lubricant under pressure whenever the vehicle is in motion. The liquid from the output shaft driven pump is not required when liquid from the engine driven pump is available. Considerable power is required to drive each of the two pumps, and as the liquid supplied by one of these pumps is required only at infrequent intervals, the power required to drive this pump represents an appreciable power loss.

In addition, in some transmissions of this type, the engine is at times coupled to the transmission input shaft through a hydraulic torque converter which multiplies the engine torque, while at other times the engine is coupled to the transmission input shaft through a lock-up clutch. Furthermore, in some transmissions of this type the transmission input and output shafts are coupled together by hydraulically operated primary clutches.

The torque transmitted through a primary clutch is substantially smaller when the lock-up clutch is engaged than that which may be transmitted when the lock-up clutch is disengaged and torque is transmitted from the engine to the transmission input shaft through the torque converter. Hence the pressure of the hydraulic operating liquid for the primary clutch may be substantially lower when the lock-up clutch is engaged than when the lock-up clutch is disengaged.

Hydraulic torque converters employed in these transmissions function most satisfactorily when the liquid within them is maintained at a substantial pressure. When the lock-up clutch associated with a hydraulic torque converter is engaged, the hydraulic torque converter is not required to transmit power from the engine to the transmission input shaft and it is not necessary to maintain the liquid in the torque converter at the same high pressure which is necessary where the torque converter is required to transmit power to the transmission. The power required to drive the pumps which supply the hydraulic operating liquid varies with the pressure of the liquid supplied, and the power consumed by the pumps may be materially reduced by reducing the pressure of the liquid supplied by the pumps to the minimum value necessary for proper operation of the torque converter and clutches.

An object of this invention is to provide an improved transmission hydraulic control system which is arranged to reduce to a minimum the power consumed by the hydraulic control apparatus.

Another object of this invention is to provide an improved transmission employing an engine driven pump and an output shaft driven pump and arranged so that one of the pumps will not consume substantial amounts of power when the supply of liquid from this pump is not required.

A further object of the invention is to provide an improved transmission of the type described which is arranged so that liquid under pressure will always be available from either pump whenever this liquid is required.

Another object of the invention is to provide improved supply means for supplying liquid under pressure to a transmission, the supply means incorporating two independently driven pumps either of which when operating is capable of supplying the liquid required, the equipment being arranged so that when both pumps are operated the power required to operate one of the pumps is reduced to a low value which is substantially less than that required to operate this pump when this pump is the only source of supply of liquid under pressure.

A further object of the invention is to provide improved supply means for supplying liquid under pressure to a transmission, the supply means comprising an engine driven pump and an output shaft driven pump, the two pumps being connected in series in such manner that normally one pump draws liquid from a sump and supplies liquid to the inlet of the second pump which supplies liquid under pressure to a supply passage leading to the transmission, the equipment being arranged so that the first pump may supply liquid to the supply passage independently of the second pump, and so that the second pump may draw liquid from the sump independently of the first pump.

Another object of the invention is to provide an improved hydraulic control system which is arranged to supply to a hydraulically operated clutch, operating liquid under relatively high pressure when the clutch may be required to transmit torque of high value, and to supply liquid at a substantially lower pressure when the clutch is required to transmit torque of low value.

A further object of the invention is to provide an improved transmission hydraulic control system of the type described and having a supply passage to which liquid is supplied by the pumps associated with the transmission, the transmission including valve means for regulating the pressure of the liquid in the supply passage, this valve means being governed to maintain the pressure of the liquid in said supply passage at a high value or at a lower value according as the lock-up clutch is disengaged or is engaged.

Other objects of the invention and features of novelty will be apparent from the following description taken in connection with the accompanying drawings.

In practicing my invention I provide a gear type pump which is driven from the output shaft of the transmission and therefore operates whenever the vehicle is in motion, but is driven in one direction at times and in the other direction at other times. This pump has inlet and outlet passages communicating with the chambers on opposite sides of the meshing portions of the gears. These passages are controlled by check valves which are arranged to insure that the pump will always supply liquid in the same direction irrespective of the direction of the rotation of the pump gears. These check valves also operate to permit an engine driven pump to draw liquid directly from the sump so as to by-pass the output shaft driven pump at times when the output shaft pump is not operating. The engine driven pump may be of the gear type and is driven from the engine so as to operate whenever the engine operates. The inlet of the engine driven pump is connected to the outlet of the output shaft driven pump so that the engine driven pump is normally supplied with liquid by the output shaft pump. A by-pass passage extending around the engine driven pump is provided to permit the output shaft pump to supply liquid directly to the passage leading from the engine driven pump. This by-pass passage is controlled by a check valve which prevents flow of liquid in the opposite direction. The arrangement of the pumps is such that liquid under pressure will always be available whenever either pump operates, and so that when both pumps operate little power normally will be required to drive the engine driven pump since the liquid supplied to it from the output shaft driven pump will be substantially at the pressure of the liquid discharged from the engine driven pump.

The control apparatus also includes valve means for regulating the pressure of the liquid discharged from the pumps. This valve means is controlled in accordance with engagement of the lock-up clutch so that a relatively high pressure is maintained when the lock-up clutch is disengaged, and so that a somewhat lower pressure is maintained when the lock-up clutch is engaged. Other valve means is provided to regulate the pressure of the liquid supplied to the hydraulic torque converter. This valve means is also governed in accordance with engagement of the lock-up clutch so that the liquid in the torque converter is maintained at one pressure when the lock-up clutch is disengaged, and at a substantially lower pressure when the lock-up clutch is engaged.

The reduction in the pressure of the liquid supplied by the pumps during engagement of the lock-up clutch materially reduces the power required to drive the pumps.

In the drawings:

Figures 1a and 1b taken together with Figure 1b at the right, form a sectional view of a transmission equipped with hydraulic control apparatus provided by this invention, this view being taken substantially along the line 1a–1b—1a–1b of Figure 2;

Figure 2 is an end elevational view of the transmission shown in Figure 1, with parts broken away to show other parts;

Figure 1B:
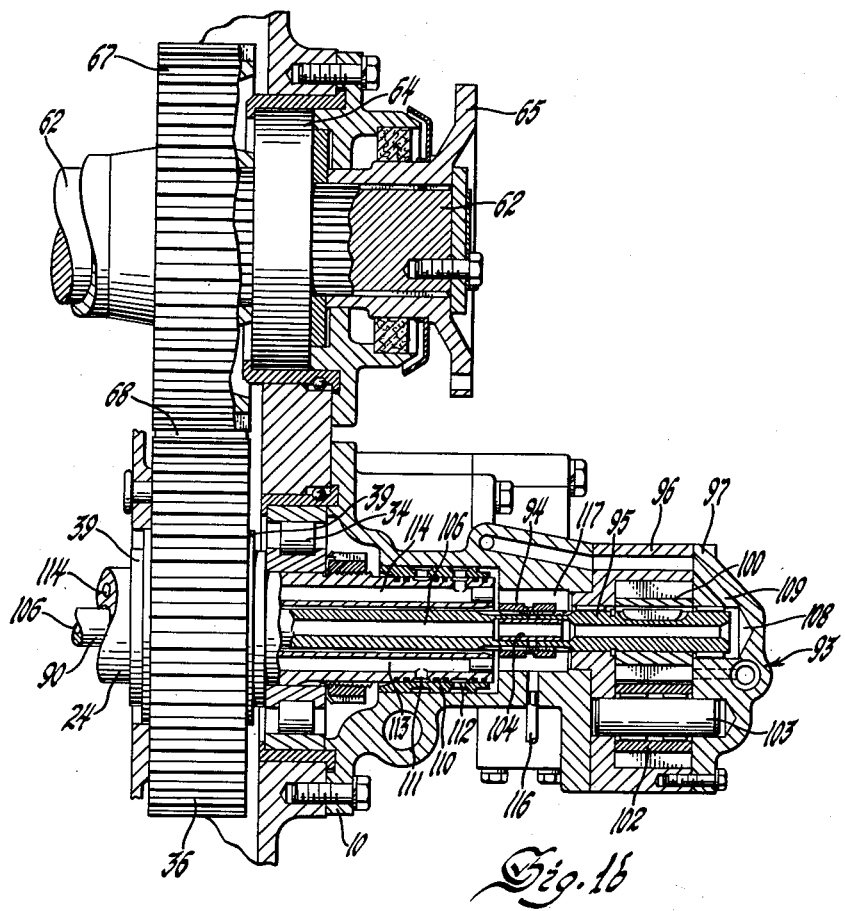

Referring to Figures 1a and 1b of the drawings there is shown therein a transmission adapted for use on a motor driven rail vehicle. However, it is to be understood that the invention is not limited to use with this specific type of transmission but is adapted for use in other transmissions.

As shown, this transmission comprises a housing 10 which is adapted to be bolted to a flywheel housing of an internal combustion engine, not shown. The transmission includes a flywheel 11 which is adapted to be mounted on the crankshaft of the engine. The flywheel 11 has secured to a face thereof the pump or driving element 12 of a conventional four-element hydraulic torque converter. The radially inner portion of the torque converter element 12 is supported by a roller bearing 14 on a tubular extension 15 which projects from the housing 10. A sealing member 16, together with sealing rings 17, cooperate to prevent escape of liquid through the joint between the torque converter element 12 and the tubular extension 15.

The usual stator members 20 and 21 of the torque converter are supported on the tubular extension 15. The torque converter includes a driven member 22 which is secured to a hub element 23 which is rigidly secured on the hollow shaft 24 which is the transmission input shaft and extends through the tubular extension 15 and has its forward end supported from the flywheel 11 by a ball bearing 25. The hub element 23 also has secured thereto the driven member 26 of a single disc lock-up clutch. The peripheral portion of the member 26 is adapted to be clamped between confronting faces of a driving element 27 and of the piston 28 which are rotatable with the flywheel 11. The piston 28 is annular in form, is movable in a bore formed in the flywheel, and is driven by the flywheel by means of driving pins, one of which is indicated at 30.

The transmission input shaft 24 is supported from the housing 10 by a ball bearing 32 and a roller bearing 34 and has mounted upon it intermediate the bearings 32 and 34, the gears 35 and 36, and the driving member 37 associated with clutches which connect the shaft with the gears. The gear 35 is rotatably supported on the shaft 24 by means of roller bearings 38, while the gear 36 is rotatably supported on the shaft 24 by similar roller bearings 39. The driving member 37 is rigidly secured on the shaft 24 so as to be rotatable with the shaft. The driving member 37 has axially extending flanges which are internally splined so as to receive the driving plates 40 of the forward clutch 50 associated with the gear 35, and to receive similar driving plates 41 of the reverse clutch 51 associated with the gear 36.

The gear 35 has secured to a face thereof a member 43 which has thereon external splines which are adapted to receive the driven plates 44 of the forward clutch 50 associated with the gear 35. The clutch plates 40 and 44 are held in position within the member 37 by means of a ring 45 which is secured in place by a lock ring mounted in a groove in the member 37. The plates 40 and 44 are at times pressed together by means of an annular piston 46 mounted within the member 37 and normally urged away from the clutch discs by means of coil springs 47 which extend between the piston 46 and the spring seat 48 which is secured on the hub of the member 37 by a lock ring 49.

In like manner, the gear 36 has secured to a face thereof a member 52 which has thereon external splines which are adapted to receive the driven plates 53 of the reverse clutch 51 associated with the gear 36. The plates 41 and 53 of the clutch 51 are held in position within the member 37 by means of a ring 54 which is secured in place by a lock ring 55 mounted in a groove in the member 37. The plates 41 and 53 are at times pressed together by means of a piston 56 mounted in a bore in the member 37 and normally urged away from the clutch discs by means of springs 57 which extend between the piston 56 and a spring seat 58 secured on the member 37 by means of a lock ring 59.

The transmission includes an output or countershaft 62 which is supported in the housing 10 by means of ball bearings 63 and 64, while the projecting end of this shaft has secured thereon a flange 65 which is adapted to have secured thereto a drive shaft, not shown, which is connected to means for driving the vehicle wheels.

The countershaft 62 has rigidly secured thereon a gear 66 which is in constant mesh with the gear 35. The shaft 62 also has secured thereon in alignment with the gear 36, a gear 67 which is of such diameter that its teeth do not engage the teeth of the gear 36. However, as is clearly shown in Figure 2 of the drawings, the gear 67 is in constant mesh with an idler gear 68 which is in constant mesh with the gear 36.

Figure 3:
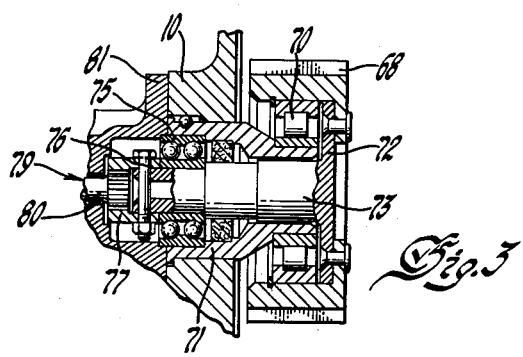
Figure 3 is a fragmentary sectional view taken substantially along the line 3—3 of Figure 2.

As is best shown in Figure 3 of the drawings, the idler gear 68 is supported by a roller bearing 70 mounted on a tubular member 71 which is secured in an opening in the transmission housing 10 and projects within the housing. The gear 68 is secured on a flange 72 on the inner end of a stub shaft 73, the outer end of which is supported from the member 71 by a ball bearing 75. The outer end of the shaft 73 has secured thereto by means of a bolt 76 the coupling member 77 which has internal splines adapted to receive the splined end of a shaft 80 which drives the output shaft oil pump indicated generally by the reference numeral 79.

The oil pump 79 comprises a housing member 81 which is secured against the outer face of the transmission housing 10 and has formed therein two substantially circular chambers in which there are mounted the gears 82 and 83. The gear 82 is mounted on an extension of the shaft 80 and is rigidly secured to this shaft so as to be rotatable with the shaft. The gear 83 is rotatably mounted on a shaft 85 which is supported by aligned bores in the housing 81 and in the cover plate which closes the chambers in the housing 81.

A hollow quill shaft 90 is located within the hollow input shaft 24 and is of such diameter that a small space is provided between exterior surface of the shaft 90 and the interior surface of the shaft 24. One end of the shaft 90 has rigidly secured thereto a flange 91 which is secured to the flywheel 11 by means of a plurality of cap screws 92, one of which is shown in the drawings. The other end of the quill shaft 90 is splined and has secured thereon the splined coupling member 94 which also receives the confronting end of the shaft 95 of a second or engine driven oil pump indicated generally by the reference numeral 93. The shaft 95 is rotatably supported in a housing member 96 and in the associated cap member 97. The housing member 96 has formed therein two substantially circular chambers in which there are mounted the gears 100 and 102. The gear 100 is secured on the shaft 95 so as to be rotatable therewith, while the gear 102 is rotatably mounted upon a stub shaft 103 which is supported in aligned bores in the housing 96 and the cap member 97.

The shaft 95 is hollow and a tubular coupling member 104 extends across the junction between the quill shaft 90 and oil pump shaft 95 so as to connect together the passages in these two shafts.

The passage 106 in the center of the quill shaft 90 communicates by way of a drilled passage 107 in the flange 91 and in the flywheel 11 with the chamber at the face of the piston 28 of the lock-up clutch.

The free end of the pump shaft 95 is open to a chamber 108 which is connected with a control valve by way of a passage 109 formed in the oil pump cap 97 and housing 96 and in the associated portion of the transmission housing 10.

The end of the hollow input shaft 24 remote from the flywheel 11 rotates in a bushing 110 secured in a portion of the transmission housing 10. This end portion of the shaft 24 has mounted thereon a plurality of spaced sealing rings which are separated by grooves 111 and 112 located in alignment with pipe connections leading from control valves as hereinafter explained. The input shaft 24 has therein a drilled passage 113, one end of which communicates with the groove 111, and the other end of which communicates through a suitable connecting passage in the clutch driving member 37 with the chamber at the face of the piston 56 of the reverse clutch 51. The input shaft 24 also has therein a passage 114 one end of which communicates with the groove 112 and the other end of which communicates through a suitable passage in the clutch member 37 with the chamber at the face of the piston 46 of the forward clutch 50.

The transmission includes means for supplying lubricant under pressure to selected bearings of the transmission. As shown, a pipe 116 communicates with the chamber 117 in the housing 10 of the transmission and surrounding the coupling 94 on the end of the quill shaft 90. This chamber is open to the space between the shafts 90 and 24 so that lubricant under pressure supplied to the chamber 117 flows to the space between shafts 90 and 24. The shaft 24 has a passage 118 drilled therein in alignment with a groove in a spacer located between the bearings 39. This spacer has a suitable oil supply hole 119 therein so that oil may flow to the space between the bearings 39 and thence to these bearings. In addition, the shaft 24 has formed therein an oil passage 120 in alignment with a groove in a spacer located between the bearings 38. This spacer has formed therein an oil hole 121 which is open to the area between the bearings 38 so that oil may flow to this area and thence to the bearings.

The oil which is supplied to the bearings 38 and 39 flows therefrom to a sump 124 at the base of the transmission housing and is supplied therefrom to the pumps, as hereinafter explained.

The housing 10 of the transmission has formed therein a passage 125 which communicates with the area within the tubular extension 15, and thus communicates with the chamber within the torque converter.

The housing 10 also has associated therewith a passage 126 which communicates through a connecting passage formed in the tubular extension 15 with the interior of the torque converter at a point radially outwardly of the tubular extension 15. The passage 126 has mounted therein a choke or restriction 127 and is adapted to have secured thereto a pipe leading to an oil cooler which may be of any suitable construction.

Figure 4:
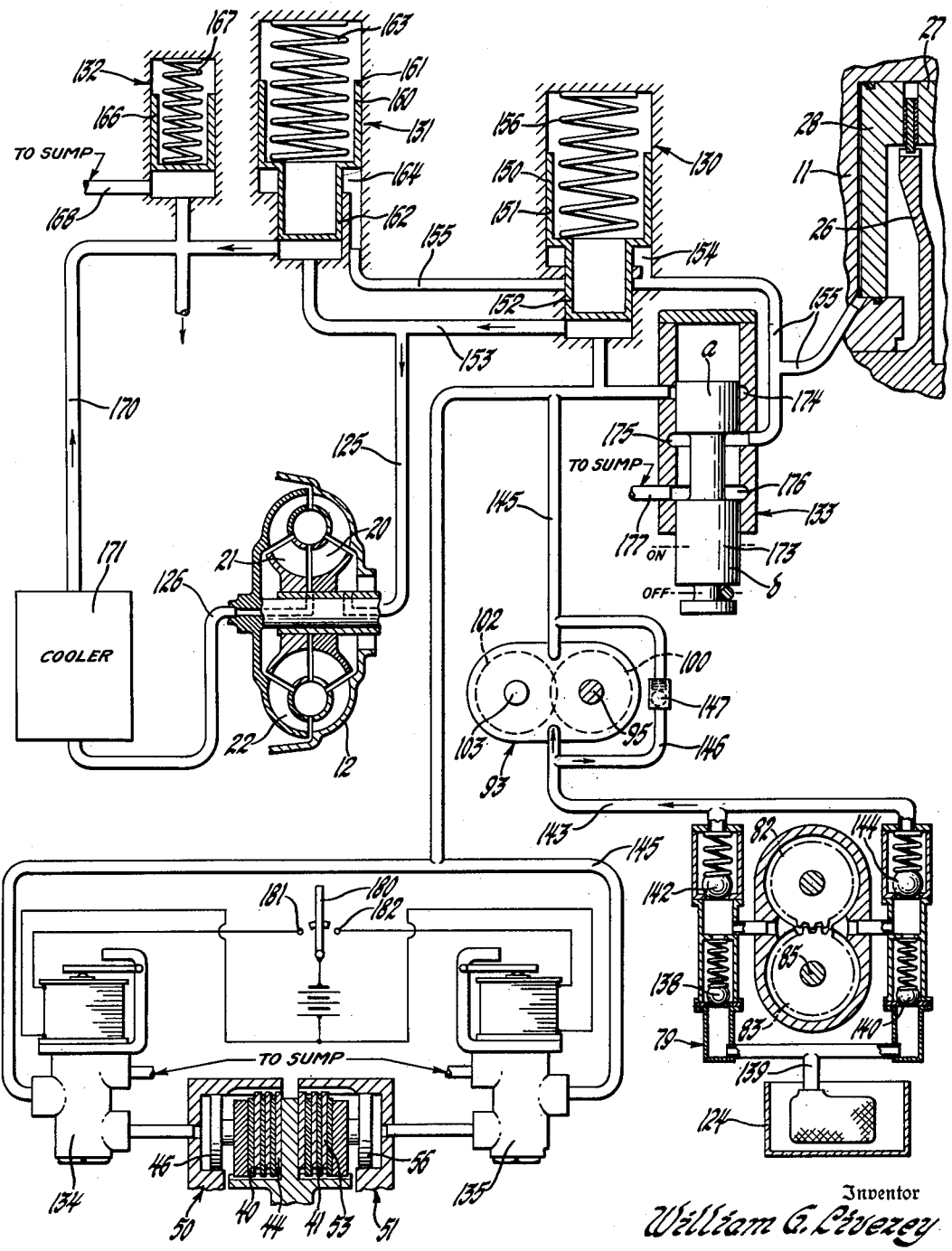
Figure 4 is a diagram of the hydraulic control system employed with this transmission.

The hydraulic system for controlling the transmission is illustrated diagrammatically in Figure 4 where it may be seen that the system includes the first or output shaft pump 79 driven from the idler gear 68, the second or engine driven pump 93 driven by the quill shaft 90, and therefore by the engine, the pressure regulating valves 130, 131, and 132, a lock-up clutch control valve 133, a forward clutch solenoid valve 134, and a reverse clutch solenoid valve 135.

The pump 79, which is driven from the idler gear 68, includes the driven gear 82 which at times is rotated in one direction and at other times is rotated in the opposite direction. For example, when the forward clutch 50 is engaged so that gear 35 is driven from the input shaft 24, the gear 66 turns the countershaft 62 with the result that the idler gear 68 turns in the same direction as the shaft 24. On the other hand, when the reverse clutch 51 is engaged so that the gear 36 is driven by the input shaft 24, the idler gear 68 is driven by the gear 36 and turns in the opposite direction to the shaft 24.

The pump 79, which is operated from the idler gear 68, is arranged to supply liquid under pressure irrespective of the direction of the rotation of the gears of the pump.

As is clearly shown in Figure 4, which is a diagram of the hydraulic control system, the chamber at one side of the meshing portion of the gears 82 and 83 is connected through a passage controlled by a ball check valve 138 with the passage 139 leading from the sump 124 at the base of the transmission housing. Similarly, the chamber on the other side of the meshing portion of the gears 82 and 83 is connected with the passage 139 through a passage which is controlled by ball check valve 140.

The ball check valves 138 and 140 are both arranged to permit liquid to flow from the passage 139 to the pump 79 and to prevent the flow of liquid to the opposite direction.

In addition, the chamber at one side of the meshing portion of the gears 82 and 83 is connected through a passage controlled by a ball check valve 142 with the passage 143 leading to the engine driven pump 93. In like manner, the chamber at the other side of the meshing portion of the gears 82 and 83 is connected through a similar ball check valve 144 with the passage 143. The ball check valves 142 and 144 are both arranged to permit liquid to be supplied from the pump 79 to the passage 143 and to prevent flow of liquid in the opposite direction.

The passage 143 leads to the inlet chamber between the gears 100 and 102 of the engine driven pump 93, while the outlet chamber of this pump has a supply pipe 145 connected thereto. A by-pass pipe 146 controlled by a ball check valve 147 extends around the engine driven pump 79 and connects the pipe 143 with the pipe 145. The ball check valve 147 operates to permit liquid to flow from the pipe 143 to the pipe 145 and to prevent flow of liquid to the opposite direction.

The valves 130, 131, and 132 determine the pressure of the liquid in various portions of the control system. These valves may be of any suitable construction and may be mounted in a body secured on one face of the housing 10 of the transmission above the pump 93, as shown in Figure 2 of the drawings. The lock-up clutch control valve 133 may also be included in this body.

As shown, the valve 130 comprises a movable element 150 having an upper end portion 151 of relatively large diameter and a lower end portion 152 of somewhat smaller diameter. The movable element 150 is mounted in a bore in the valve body, this bore having portions of different diameter adapted to receive the two portions of the movable element. The end portion 152 of small diameter of the movable valve element 150 is subject to the pressure of the fluid in the chamber to which the supply pipe 145 is connected. This end portion 152 of the valve element 150 controls communication between the supply pipe 145 and a pipe 153 leading to the torque converter and also to the valve 131. The body of the valve device has therein a chamber 154 at the face of the shoulder joining the portions 151 and 152 of the valve element 150. The chamber 154 has connected thereto a branch of the pipe 155 leading to the chamber in the lock-up clutch. The valve element 150 is moved downwardly by the force exerted by a coil spring 156, and is moved against this spring by liquid under pressure in the chamber at the face of the portion 152 of small diameter, and by liquid under pressure in the chamber 154. The various parts of the equipment are arranged and proportioned so that when the valve element 150 is moved against the spring 156 solely by the force exerted by liquid under pressure acting on the small diameter portion 152 of the valve element, that is by the liquid in pipe 145, the pressure of this liquid must build up to relatively high value, such as 100 pounds to the square inch, in order to move the valve element against the spring and permit liquid to flow to the pipe 153. Hence, at these times the pressure in the supply pipe 145, and in the associated connecting pipes, is maintained at a relatively high value.

On the other hand, when liquid under pressure is supplied to the chamber 154 to assist in moving the element 150 against the spring 156, the valve element 150 will be moved against the spring 156 when the pressure of the fluid in the pipe 145 increases to a somewhat lower level, as for example, 60 pounds to the square inch. Accordingly, when liquid is supplied to the chamber 154, the liquid in the pipe 145, and in the connecting pipes, is maintained at a somewhat lower pressure than is present when liquid is not supplied to the chamber 154.

The valve 131 is similar in construction to the valve 130 and has a movable element 160 having a portion 161 of relatively large diameter and a portion 162 of relatively small diameter. The movable element 160 is mounted in a bore in the body of the valve device, this bore having portions of different diameter to receive the two portions of the valve element. The valve element is urged to the closed position by a coil spring 163. The portion of small diameter 162 of the valve element 160 controls the flow of liquid from pipe 153 to the pipe 116 leading to the lubricant passages in the transmission and also leading to the valve 132. The end face of the portion of small diameter 162 of the valve element 160 is subject to the pressure of the liquid in a chamber to which the pipe 153 is connected, while the chamber 164 at the face of the shoulder joining the portions 162 and 161 of the valve element 160 has connected thereto a branch of the pipe 155 leading from the lock-up clutch. The valve 131 operates in substantially the same manner as the valve 130 so that the valve 131 causes the pressure of the liquid in the pipe 153, and therefore in the torque converter, to be maintained at one value when the chamber 164 is not supplied with liquid under pressure and to be maintained at a substantially lower value when the chamber 164 is supplied with liquid under pressure.

The valve 132 includes a movable valve element 166 which is urged to the closed position by coil spring 167 and controls the supply of liquid from the lubricant passage 116 to the passage 168 leading to the sump 124. The various parts of this valve are arranged and proportioned so that the valve element 166 is moved against the associated spring 167 when the liquid in the pipe 116 builds up to a relatively low pressure, such as ten pounds to the square inch. Hence, the valve 132 operates to maintain the lubricant in the lubricant passage 116 at a relatively low value which is sufficient to insure proper lubrication of the transmission. The pipe 170 leading from the oil cooler 171 connects with the lubricant pipe 116 so that the pressure of the lubricant in the oil cooler is regulated by the valve 132.

The valve 133, which controls the supply of liquid under pressure to the chamber at the face of the piston 28 of the lock-up clutch, comprises a valve element 173 which is mounted in a bore in the body of the valve device and is movable between an "off" position and an "on" position. The valve element 173 may be moved between its two positions either manually by an operator or automatically in response to the speed of the vehicle. The valve element 173 has intermediate its ends a portion of reduced diameter which has at one side a land $a$ and at the other side a land $b$. The body of the valve device has formed therein a groove 174 to which is connected a branch of the supply pipe 145, and groove 175 to which is connected the pipe 155 leading to the lock-up clutch. It is to be understood that the pipe 155 is connected to the passage 109 in the housing 10 of the transmission, and thus through the passage 106 in the shaft 90 and the passage 107 in the flywheel 11 to the chamber at the face of the piston 28 of the lock-up clutch. The body of the valve device also has formed therein a groove 176 to which is connected a pipe 177 leading to the sump 124.

The various parts of the valve 133 are arranged and proportioned so that when the valve element 173 is in its "off" position, the land $a$ blocks the groove 174, while the area between the lands $a$ and $b$ connects to the discharge pipe 177 the pipe 155 leading to the lock-up clutch. When the valve element 133 is in its "on" position, the land $b$ blocks the groove 176, while the area between the lands $a$ and $b$ connects the supply pipe 145 with the pipe 155 leading to the lock-up clutch.

A branch of the supply pipe 145 leads to the forward clutch solenoid valve 134 and also to the reverse clutch solenoid valve 135. These valves control the supply of the liquid under pressure to and the release of liquid under pressure from the chambers at the faces of the pistons of the forward and reverse clutches, respectively.

The solenoid valves may be of any suitable construction well known in the art, as for example those illustrated in Figure 5 of U. S. Patent No. 2,075,138, issued February 23, 1937, to Oliver K. Kelley. Each of the solenoid valves has a valve element biased by a spring or other means to a position in which it cuts off the supply of liquid under pressure to the chamber of the associated clutch and connects the clutch chamber to a pipe leading to the sump. Each of the solenoid valves includes a winding effective when energized to move the valve element of the valve device to a position to cut off communication between the chamber of the associated clutch and the sump, and to establish communication from the supply pipe 145 to the chamber of the associated clutch.

The solenoid valves have associated therewith manually controlled means for governing the supply of energy to their windings. As shown, this means comprises a manually operated switch having a movable contact or switch blade 180 and two stationary contacts 181 and 182. When the switch blade 180 is in its intermediate position it is out of engagement with both of the associated stationary contacts, and the windings of both solenoid valves are deenergized. On movement of the switch blade 180 in one direction from its intermediate position, it engages stationary contact 181 to establish a circuit for supplying energy from a battery to the winding of the forward clutch solenoid valve 134, while on movement of the blade 180 in the opposite direction from its intermediate position, it engages the stationary contact 182 to establish a circuit for supplying energy to the winding of the reverse clutch solenoid valve 135.

The equipment is shown in drawings in the condition which it assumes when both solenoid valves are deenergized and when the movable element 173 lock-up clutch control valve 133 is in its "off" position. When the engine is operated with the equipment in this condition, the flywheel 11 rotates so that the shaft 90 rotates and drives the engine driven pump 93. At this time the vehicle will not ordinarily be in motion so the output shaft pump 79 associated with the idler gear 68 does not operate. Under these conditions the engine driven pump 93 draws oil from the sump 124 through the pipe 139, and through the check valves 138, 140, 142 and 144 associated with the output shaft pump 79. Hence, the engine driven pump 93 is capable of supplying liquid under pressure to the supply passage 145 even though the ouptut shaft pump 79 is inactive and is not supplying liquid. The liquid supplied from the engine driven pump 93 is supplied to the supply pipe 145, and is prevented by the check valve 147 from flowing through the by-pass pipe 146 to the pipe 143. Accordingly, all of the liquid supplied by the engine driven pump 93 is available for use in the transmission.

As the movable element 173 of the lock-up control valve 133 is assumed to be in its "off" position, the chambers 154 and 164 of the valve devices 130 and 131, respectively, are both connected to the sump and these valve devices both operate to maintain the fluid in the associated pipes at relatively high values.

The pressure of the fluid in the supply pipe 145 is maintained at a relatively high value by the valve 130, while liquid from this pipe supplied through valve 130 to the pipe 153 flows to the passage 125 leading to the torque converter, thence through the torque converter and out through the passage 126 leading to the cooler 171. The passage 126 has therein the restriction indicated at 127 which limits the flow of liquid from the torque converter and insures that the pressure maintained in the torque converter will be the pressure determined by the valve 131.

Liquid supplied to the passage 153 also flows through the valve 131 to the passage 116 which is governed by the valve device 132, and which has a branch leading to the lubricant passages in the transmission. Hence, lubricant under pressure is supplied to the transmission.

As a result of the presence of liquid under pressure in the torque converter, the torque converter driven member 22 will be rotated and will drive the transmission input shaft 24 so that the clutch driving member 37 will be rotated. However, at this time both the forward and reverse clutches are disengaged so that force is not transmitted from the members 37 to the gears 35 and 36 and these gears remain stationary while the idler gear 68 also remains stationary. Similarly, the lock-up clutch is not engaged and it is ineffective to transmit force to the shaft 24.

If the operator wishes to cause the vehicle to move he may do so by moving the blade 180 of the control switch to the proper position depending upon the direction it is desired to have the vehicle move. If the blade is moved to its forward position to energize the winding of the forward clutch solenoid valve 134, this valve will operate to cause liquid under pressure to be supplied from the supply pipe 145 to the pipe leading to groove 112 and thus to passage 114 leading to the chamber at the face of the piston 46 of the forward clutch 50. On an increase in the pressure of the fluid in this chamber the piston 46 is moved against the springs 47 and presses the clutch plates 40 and 44 together to connect the clutch driving member 37 with the driven member 43 and thus cause the gear 35 to be rotated by the transmission input shaft 24.

At this time, as the valve device 130 is conditioned to maintain the pressure of the liquid in the supply pipe 145 at the maximum value, and as the pressure of the liquid in the chamber at the face of the piston 46 of the forward clutch 50 builds up to the full value of the pressue of the liquid in the supply pipe 145, it follows that relatively great force is available to press together the plates 40 and 44 of the forward clutch with the result this clutch is capable of transmitting relatively great torque to the gear 35. This is desirable since at this time the transmission input shaft 24 is being driven from the engine through the torque converter and the torque converter is capable of multiplying the engine torque with the result that the torque applied to the shaft 24, and transmitted therefrom through the clutch to the gear 35, may be of relatively great value. Since liquid under relatively high pressure is available to operate the forward clutch, this clutch is certain to be able to transmit without slipping the torque supplied through it.

When the gear 35 is rotated it drives the gear 66 and thus drives the transmission output or countershaft 62 with the result that the flange 65 is rotated and drives the propeller or drive shaft, not shown, so as to drive the vehicle wheels.

When the countershaft 62 is rotated, the gear 67 also turns and drives the idler gear 68 which in turn drives the gear 36. However, at this time the reverse clutch 51 is disengaged so that the gear 36 is free to turn.

When the idler gear 68 is rotated as a result of rotation of the output or countershaft 62, the pump 79 associated with this gear operates and draws liquid from the sump 124 through the pipe 139 and supplies liquid under pressure to the pipe 143 leading to the engine driven pump 93. The liquid drawn from the sump through the pipe 139 will flow to the pump 79 through one or the other of the check valves 138 or 140 depending upon the direction of rotation of the pump gears. Similarly, the liquid discharged from this pump will flow from the pump to the pipe 143 through one or the other of the check valves 142 and 144 depending upon the direction of rotation of the gears of the pump. In addition, one or the other of the check valves 138 or 140 will prevent liquid discharged from the pump 79 from flowing to the pipe 139, while one or the other of the check valves 142 or 144 will prevent liquid supplied from the pump 79 to the pipe 143 from flowing back to the inlet side of the pump.

The liquid supplied from pump 79 to the pipe 143 flows to the inlet side of the engine driven pump 93 and is discharged from this pump to the supply pipe 145. The liquid which is supplied through pipe 143 to the engine driven pump is under substantial pressure with the result that relatively little if any additional pressure must be developed on this liquid to increase it to the pressure at which the liquid in the supply pipe 145 is maintained by the valve device 130.

Since under these conditions the engine driven pump is required only to develop a small additional pressure on the liquid supplied to the supply pipe 145, the power required to drive this pump is much less than would be required if this pump received liquid directly from the sump, and was required to increase to the full value of the liquid in the supply passage all of the liquid passing through the pump.

Under conditions of high engine speed and low vehicle speed, the engine driven pump 93, because of its higher speed of operation, may have substantially greater capacity than the output shaft pump 79. Under these conditions the pump 93 not only will take up all of the liquid supplied by the pump 93, but will take liquid from the pipe 143 so rapidly that the pressure in the pipe 143 will be reduced to a value such that liquid from the sump will flow to the pipe 143 through the pipe 139 and through the check valves associated with the pump 79. Under these conditions, the pressure on the discharge side of the pump 79 is no higher, if as high as the pressure on the inlet side of the pump. Hence, little if any power is consumed in driving the pump 79, and the power required to drive the pump is much less than would be required to drive the pump if the pump supplied liquid directly to the supply passage 145.

When the speed of the vehicle has increased to a suitable rate the lock-up clutch control valve 133 may be operated either manually or automatically, so as to cause the lock-up clutch to connect the engine directly to the shaft 24. When the element 173 of the lock-up clutch control valve 133 is moved to its "on" position liquid from the supply pipe 145 is supplied to the pipe 155, and thence through the passage 109 in the transmission housing 10, through the passage 106 in the shaft 90, and also through the connecting passage 107 in the flywheel 11 to the chamber at the face of the piston 28 of the lock-up clutch. As a result the driven disc 26 of the lock-up clutch is clamped between the piston 28 and the plate 27 so that the driven disc rotates with the flywheel and causes the transmission input shaft 24 to be rotated at the same speed as the flywheel 11. At this time the forward clutch 50 remains engaged so that the gear 35 is driven from the input shaft 24 and causes the countershaft 62 to drive the vehicle drive shaft.

On the supply of liquid under pressure to the pipe 155 leading to the lock-up clutch, liquid flows through a branch of the pipe 155 to the chamber 154 of the valve device 130 and also to the chamber 164 of the valve device 131.

As a result of the supply of liquid under pressure to the chamber 154 of the valve device 130, this valve device operates as previously explained to maintain the pressure of the liquid in the supply pipe 145 at a substantially lower level than that at which it had previously been maintained. Similarly, on the supply of liquid under pressure to the chamber 164 of the valve device 131, this valve device operates to maintain the pressure of the liquid in the torque converter at a substantially lower pressure than that at which it had previously been maintained.

On the reduction in the pressure maintained on the liquid in the supply pipe 145 there is a corresponding reduction in the pressure of the liquid in the chamber at the face of the piston 46 of the forward clutch 50. Hence, there is a reduction in the force pressing the plates 40 and 44 of this clutch together. However, at this time the input shaft 24 is driven directly from the engine instead of through the torque converter, and the maximum torque which the clutch may be required to transmit is substantially less than that which may have been transmitted to the clutch through the torque converter. Accordingly, when the lock-up clutch is engaged, and the input shaft 24 is driven directly from the engine, it is not necessary for clutch plates to be held together with as much force as is required when the shaft 24 is driven from the engine through the torque converter. The various parts are arranged and proportioned so that the pressure maintained on the liquid in the supply passage 145 by the valve device 130 after the supply of liquid to the chamber 154 is sufficient to insure that the plates 40 and 44 of the forward clutch will be pressed together firmly enough to transmit without slipping all of the torque available from the engine.

On the reduction in the pressure maintained on the liquid in the supply passage 145, there is a corresponding reduction in the pressure of the liquid in the chamber at the face of the piston 28 of the lock-up clutch. However, the piston 28 is of relatively large diameter and has a relatively large working area so that the force exerted by the liquid at the reduced pressure is sufficient to insure that the lock-up clutch can transmit without slipping all the torque available from the engine.

In addition, at this time the valve device 131 reduces the pressure maintained on the liquid supplied through pipe 125 to the torque converter. Accordingly, the liquid in the torque converter is maintained at a substantially lower pressure level than that which previously existed. At this time the torque converter is not required to transmit torque so it is not necessary to maintain in the torque converter the same high liquid pressure which was present and is desirable when the torque converter is transmitting torque from the engine to the shaft 24.

Under these conditions the pressure maintained by the valve 132 in the lubricant passage 116 is unaffected and lubricant is maintained at the pressure level effective to insure proper lubrication of the transmission.

From the foregoing it will be seen that when the lock-up clutch is engaged it is unnecessary for the pressure of the liquid supplied to the forward clutch, and to the torque converter, to be maintained at the previous levels and that the equipment is arranged to substantially reduce the pressures at which the liquid in these elements is maintained. This reduction in the pressure which is maintained in these elements at this time materially reduces the load on the pumps, and correspondingly reduces the power required to drive the pumps, so that there is an appreciable saving in power consumption.

On subsequent movement of the valve element 173 of the lock-up clutch control valve 133 to its "off" position, the supply of liquid from the supply passage 145 to the pipe 155 leading to the lock-up clutch is cut off, and the pipe 155 is connected to the pipe 177 leading to the sump. As a result the liquid under pressure in the chamber at the face of the piston 28 of the lock-up clutch is released, while the liquid in the chambers 154 and 164 of the valve devices 130 and 131, respectively, is also released. On release of liquid from the chamber 154 of the valve device 130, this valve device operates to increase the pressure maintained on the liquid in the supply pipe 145, and therefore increases the pressure in the chamber at the face of the piston 46 of the forward clutch 50. This increase in the pressure in this chamber at this time is desirable since this clutch may be required to transmit the torque supplied through the torque converter.

Similarly, on release of the liquid from the chamber 164 of the valve device 131, the valve device 131 operates to increase the pressure maintained on the liquid in the torque converter. This is desirable since the torque converter may be required to transmit torque from the engine to the shaft 24.

On subsequent movement of the blade 180 of the control switch to its intermediate position to interrupt the circuit of the winding of the forward clutch solenoid valve 134, this valve operates in the usual manner to cut off the supply of liquid under pressure to the forward clutch and to release liquid under pressure therefrom so that the piston 46 ceases to exert force to press the clutch discs 40 and 44 together with the result that the clutch driven member 43 and the gear 35 ceases to be driven from the input shaft 24.

The equipment operates in a similar manner when the vehicle is to be driven in the reverse direction. When it is desired to operate the vehicle in the reverse direction, the movable contact 180 of the control switch is moved to the position in which it establishes the circuit of the reverse clutch solenoid valve 135 and this valve device causes liquid under pressure to be supplied from the supply pipe 145 to the chamber at the face of the piston 56 of the reverse clutch 51. Hence, this piston presses the plates 41 and 53 of the reverse clutch together so that the driven member 52 and the gear 36 are rotated by the shaft 24. The gear 36 drives the idler gear 68, and the gear 68 in turn drives the gear 67 with the result that the output or countershaft 62 and the flange 65 rotate and drive the vehicle drive shaft in the direction to cause the vehicle to move in the reverse direction.

On rotation of the idler gear 68 by torque supplied through the reverse clutch and the gear 36, the gears of the pump 79 associated with the idler gear rotate in the directions opposite to that in which they were rotated when this pump was driven while the forward clutch was engaged. Under these conditions the pump 79 continues to draw liquid from the sump through the pipe 139 and to supply liquid to the pipe 143 leading to the engine driven pump. The ball check valves associated with the pump 79 insure that the pump will function properly at this time.

As explained above in connection with operation of the equipment during forward movement of the vehicle, as long as the lock-up clutch is disengaged, the valve devices 130 and 131 maintain the pressure of the liquid in the reverse clutch, and in the torque converter, at relatively high levels, but when the lock-up clutch is engaged, the pressures maintained by the valve devices 130 and 131 are materially reduced to thereby reduce the power consumed by the pumps which provide the liquid under pressure.

The equipment is arranged to insure that when the vehicle is operated with the engine idle, lubricant under pressure will be available to lubricate the transmission, and will also be available for control purposes in the event it is desired to start the engine by force transmitted from the vehicle wheels. This transmission is intended for a rail vehicle, and the vehicle might be coupled in a train and operated as part of the train without operating the engine of the vehicle. Under such circumstances it is desirable to have lubricant under pressure available to lubricate the transmission.

Whenever the vehicle is operated the vehicle propeller shaft and the output shaft 62 turn and gear 67 drives the idler gear 68. As previously explained, the pump 79 associated with the idler gear 68 is constructed in such manner that it will always supply liquid under pressure to the pipe 143 irrespective of the direction of rotation of the gears of the pump. Hence, whenever the vehicle is operated, liquid under pressure will be supplied by the pump 79 to the pipe 143, and will be supplied therefrom to the transmission lubricating passages.

When the engine is not operating the engine driven pump 93 is idle and liquid supplied to the pipe 143 cannot flow through this pump to the supply pipe 145. However, at this time liquid supplied by the pump 79 to the pipe 143 may flow through the check valve 147 and the pipe 146 to the supply pipe 145 with the result that pressure will be developed on the liquid in the pipe 145 as the result of operation of the pump 79.

On a supply of liquid under pressure to the pipe 145 liquid is supplied therefrom through the valve device 130 and the valve device 131 to the lubricant passage 116 so that the transmission is certain to be lubricated whenever the vehicle is in motion.

In addition, on the supply of liquid under pressure to the passage 145, liquid may be supplied therefrom to the forward or to the reverse clutch on energization of one of the solenoid valves so that either of these clutches may be engaged to cause the shaft 24 to be driven from the vehicle wheels. Similarly, liquid may be supplied from the supply pipe 145 through the control valve 133 to the pipe 155 leading to the lock-up clutch so that the flywheel 11 may be driven from the shaft 24 and thus cause the engine to be rotated by force transmitted from the vehicle wheels.

When the engine rotates, either as a result of its own operation or as a result of being driven from the vehicle wheels, the engine driven pump operates and the equipment is again substantially in its normal condition.

From the foregoing it will be seen that this transmission control system employs two pumps, one of which is driven by the engine and the other, a second of which is driven whenever the output shaft rotates so that the second pump operates whenever the vehicle is in motion. This arrangement insures that liquid under pressure will always be available whenever required not only to lubricate the transmission, but also to perform control functions. In addition, it will be seen that the two pumps are connected in series so that even though both pumps are driven during normal operation of the vehicle the power required to drive one of the pumps is reduced to a very small value with the result that the power required by both pumps is substantially not greater than that which is required by a single one of the pumps. The arrangement of the pumps therefore is such as to make available liquid under pressure in response to two entirely different operating conditions, but at the same time to reduce the power consumed by the pumps substantially to the amount which would be required if only one pump was provided.

In addition, it will be seen that the control system is arranged so that the pressure of the liquid supplied by the pumps is controlled in accordance with operating conditions of the transmission. When the lock-up clutch is disengaged and liquid under high pressure is required for operation of the forward and reverse clutches the pressure of the liquid supplied by the pumps is maintained at a suitable high level. On the other hand, when the lock-up clutch is engaged, which is the situation during most of the time of operation of the vehicle, the pressure required for operation of the forward and reverse clutches is somewhat lower and the valve means is arranged to maintain the pressure of the liquid supplied by the pumps at this time at this lower value. This substantially further reduces the power required to drive the pumps.

Accordingly, it can be seen that the control system operates to provide liquid under pressure whenever it is required and at the pressure necessary for proper operation of the transmission and it provides this liquid with the minimum of power consumption by the pumps.

I claim:

1. In a transmission for a self-propelled vehicle having an engine, an output shaft, a clutch effective when engaged to establish driving connection between said engine and said output shaft, a chamber adapted to contain liquid under pressure, means operative on the supply of liquid under pressure to said chamber to engage said clutch, a first pump having its inlet connected through a first check valve to a source of liquid and having its outlet connected to a supply passage, a second pump having its inlet connected to said source of liquid and having its outlet connected to the inlet of said first pump, the outlet of said second pump also being connected to said supply passage through a check valve arranged to permit flow of liquid to said supply passage, means adapted to be connected to the engine for driving one of said pumps, means connected to the output shaft for driving the other one of said pumps, and manually controlled means for supplying liquid from said supply passage to the chamber of said clutch.

2. In a transmission for a self-propelled vehicle having an engine, an output shaft, a clutch effective when engaged to establish driving connection between said engine and said output shaft, a chamber adapted to contain liquid under pressure, means operative on the supply of liquid under pressure to said chamber to engage said clutch, a first pump having its outlet connected to a supply passage, a second pump having its inlet connected to a source of liquid and having its outlet connected to the inlet of said first pump, a passage controlled by a first check valve for connecting the inlet of said first pump to said source of liquid, a passage controlled by a second check valve for connecting the outlet of said second pump to said supply passage, means adapted to be connected to the engine for driving one of said pumps, means connected to the output shaft for driving the other of said pumps, and manually controlled means for supplying liquid from said supply passage to the chamber of said clutch.

3. In a transmission for a self-propelled vehicle having an engine, an output shaft, means including a clutch effective when engaged to establish driving connection between said engine and said output shaft so that at times said output shaft is rotated in one direction and at other times is rotated in the other direction, a chamber adapted to contain liquid under pressure, means operative on the supply of liquid under pressure to said chamber to engage said clutch, a first pump adapted to be driven by said engine, said first pump having an inlet passage and a discharge passage, a by-pass passage extending between the inlet and discharge passages of said first pump and having therein a first check valve, a second pump comprising a casing having a pair of meshing gears rotatably mounted therein, means for driving one of said gears from said output shaft so that at times said gear rotates in one direction and at other times rotates in the other direction, said casing having at one side of the enmeshing portions of said gears a first operating chamber and having at the other side of the enmeshing portions of said gears a second operating chamber, said first operating chamber being connected through a second check valve with an inlet passage and being connected through a third check valve with a discharge passage, said second operating chamber being connected through a fourth check valve with said second pump inlet passage and being connected through a fifth check valve with said second pump discharge passage, the inlet passage of one of said pumps being connected to the discharge passage of the other one of said pumps, the inlet passage of the other one of said pumps being connected to a source of liquid, and manually controlled means for supplying liquid under pressure from the discharge passage of the remaining one of said pumps to the chamber of said clutch.

4. In a transmission for a self-propelled vehicle having an engine, an output shaft, means including a clutch effective when engaged to establish driving connection between said engine and said output shaft so that at times said output shaft is rotated in one direction and at other times is rotated in the other direction, a chamber adapted to contain liquid under pressure, means operative on the supply of liquid under pressure to said chamber to engage said clutch, a first pump adapted to be driven by said engine, said first pump having an inlet passage and a discharge passage, a by-pass passage extending between the inlet and discharge passages of said first pump and having therein a first check valve, a second pump comprising a casing having a pair of meshing gears rotatably mounted therein, means for driving one of said gears from said output shaft so that at times said gear rotates in one direction and at other times rotates in the other direction, said casing having at one side of the enmeshing portions of said gears a first operating chamber and having at the other side of the enmeshing portions of said gears a second operating chamber, said first operating chamber being connected through a second check valve with an inlet passage and being connected through a third check valve with a discharge passage, said second operating chamber being connected through a fourth check valve with said second pump inlet passage and being connected through a fifth check valve with said second pump discharge passage, one of said pumps having its inlet passage connected to a source of liquid and having its discharge passage connected to the inlet passage of the other one of said pumps, and manually controlled means for supplying liquid under pressure to the chamber of said clutch from the discharge passage of the remaining one of said pumps.

5. In a transmission for a self-propelled vehicle having an engine, an output shaft, a clutch effective when engaged to establish driving connection between said engine and said output shaft, a chamber adapted to contain liquid under pressure, means operative on the supply of liquid under pressure to said chamber to engage said clutch, a first pump having its outlet connected to a supply passage, a second pump having its inlet connected to a source of liquid and having its outlet connected to the inlet of said first pump, a passage controlled by a first check valve for connecting the inlet of said first pump to said source of liquid, a passage controlled by a second check valve for connecting the outlet of said second pump to said supply passage, means adapted to be connected to the engine for driving one of said pumps, means connected to the output shaft for driving the other of said pumps, said transmission including a lubricant passage through which lubricant under pressure may be supplied to operating portions of said transmission, means for supplying liquid under pressure from said supply passage to said lubricant passage, and manually controlled means for supplying liquid from said supply passage to the chamber of said clutch.

6. In a liquid supply system for a vehicle transmission having an input shaft, an output shaft, coupling means effective when engaged to establish driving connection between said input and output shafts, a chamber adapted to contain liquid under pressure, means operative on the supply of liquid under pressure to said chamber to engage said coupling means, and valve means for at times connecting said chamber to exhaust and for at other times connecting said chamber to a supply passage, said liquid supply system comprising a first pump having its outlet connected to said supply passage, a second pump having its inlet connected to a source of liquid and having its outlet connected to the inlet of said first pump, a passage controlled by a first check valve for connecting the inlet of said first pump to said source of liquid, a passage controlled by a second check valve for connecting the outlet of said second pump to said supply passage, means connected to the input shaft for driving one of said pumps, and means connected to the output shaft for driving the other one of said pumps.

7. In a liquid supply system for a vehicle transmission having an input shaft, an output shaft, coupling means effective when engaged to establish driving connection between said input and output shafts, a chamber adapted to contain liquid under pressure, means operative on the supply of liquid under pressure to said chamber to engage said coupling means, and valve means for at times connecting said chamber to exhaust and for at other times connecting said chamber to a supply passage, said liquid supply system comprising a first pump having its inlet connected through a first check valve to a source of liquid and its outlet connected to said supply passage, a second pump having its inlet connected to a source of liquid through a connection independent of the first check valve and having its outlet connected to the inlet of said first pump, a passage controlled by a second check valve for connecting the outlet of said second pump to said supply passage, means connected to the input shaft for driving one of said pumps, and means connected to the output shaft for driving the other one of said pumps.

8. In a liquid supply system for a vehicle transmission having an input shaft, an output shaft, coupling means effective when engaged to establish driving connection between said input and output shafts, a chamber adapted to contain liquid under pressure, means operative on the supply of liquid under pressure to said chamber to engage said coupling means, and valve means for at times connecting said chamber to exhaust and for at other times connecting said chamber to a supply passage, said liquid supply system comprising a first pump driven by the input shaft, said first pump having an inlet passage and a discharge passage, a bypass passage extending between the inlet and discharge passages of said first pump and having therein a first check valve arranged to permit flow from said inlet passage to said discharge passage, a second pump comprising a casing having a pair of meshing gears rotatably mounted therein, means for driving one of said gears from said output shaft so that at times said gear rotates in one direction and at other times rotates in the other direction, said casing having at one side of the enmeshing portions of said gears a first operating chamber and having at the other side of the enmeshing portions of said gears a second operating chamber, said first operating chamber being connected through a second check valve with an inlet passage and being connected through a third check valve with a discharge passage, said second operating chamber being connected through a fourth check valve with said second pump inlet passage and being connected through a fifth check valve with said second pump discharge passage, the discharge of one of said pumps being connected to said supply passage, the inlet passage of said one of said pumps being connected to the discharge passage of the other one of said pumps, and the inlet passage of the said other one of said pumps being connected to a source of liquid.

9. In a transmission for a self-propelled vehicle having an engine, said transmission comprising an input shaft, an output shaft, means for at times establishing driving connection between said input and output shafts, a lubricant passage through which lubricant under pressure may be supplied to operating portions of said transmission, a first pump having its outlet connected to said lubricant passage, a second pump having its inlet connected to a source of lubricant and having its outlet connected to the inlet of said first pump, a passage controlled by a first check valve for connecting the inlet of said first pump to said source of lubricant, a passage controlled by a second check valve for connecting the outlet of said second pump to said lubricant passage, means connected to the input shaft for driving one of said pumps, and means connected to the output shaft for driving the other one of said pumps.

References Cited in the file of this patent

UNITED STATES PATENTS

| | | |
|---|---|---|
| 1,889,517 | Roessler | Nov. 29, 1932 |
| 2,073,774 | Atteslander | Mar. 16, 1937 |
| 2,170,538 | Sarver | Aug. 22, 1939 |
| 2,226,801 | Black | Dec. 31, 1940 |
| 2,328,091 | Nutt et al. | Aug. 31, 1943 |
| 2,328,092 | Nutt et al. | Aug. 31, 1943 |
| 2,416,154 | Chilton | Feb. 18, 1947 |
| 2,440,624 | Wemp | Apr. 27, 1948 |
| 2,461,218 | Lapsley | Feb. 8, 1949 |
| 2,470,103 | Lochman | May 17, 1949 |
| 2,532,856 | Ray | Dec. 5, 1950 |